Patented June 26, 1934

1,964,088

UNITED STATES PATENT OFFICE 1,964,088

PLASTIC

Foster Dee Snell, Brooklyn, N. Y., assignor to Travatex Products Corporation, New York, N. Y., a corporation of New York No Drawing. Application November 15, 1929, Serial No. 407,566

10 Claims. (Cl. 18—47.5)

My invention relates to improvements in artificial stone, and more particularly has reference to a plastic composition intended to simulate natural travertine marble, the present invention having to do more particularly with the composition or mix.

Numerous compositions of this type have been used for various building purposes, particularly as flooring cast in place. Such compositions differ from that claimed in two respects. When precast they warp. Organic filler such as wood flour or sawdust is used. Some precast stones of this type have been claimed. They are made with organic filler in practically all cases. They do not have the fine finished surface that stones made according to this process have, are necessarily cast thicker and/or with reinforcement, and in most cases warp.

In contrast with this I have developed a method of manufacture and formula for stones of an improved surface, which may be cast 12 x 24 x ½ inch without reinforcement and which do not warp in drying and aging.

In the preferred embodiment of my invention I take about 85 pounds of marble dust which, commercially understood, is "through 8 mesh on 20 mesh", such as is known in the trade as Middlebury White. I add about 13 to 15 pounds of magnesite, varying with the degree of purity. This is a white powder which I may color to suit, preferably using mineral colors. This is a dry mix and may be turned over in a mixer of the type of a concrete mixer. To this I add about 7 to 8 liquid quarts of magnesium chloride of about 21 to 25 degree Baumé, and about 1 to 1½ liquid quarts of about 21 to 25 degree magnesium sulphate solution. While the amounts of these may vary, they vary in accordance with the composition of the dry mix as hereinafter set forth.

A waterproofing material such as China wood oil may be added at this stage but is neither essential nor a part of this invention.

Part or all of the marble may be substituted by other inert aggregate, such as silica, feldspar, tripoli, or similar material. The magnesite should be quick setting, should have a low free lime content, and should be high in active magnesium oxide as understood in the trade. The amount of magnesium chloride should be so proportioned to the amount of active magnesium oxide in the magnesite as to approximately correspond to the ratio in chemical equivalents of 0.52 $MgCl_2$ : 3 $MgO$.

The amount of magnesium sulphate should correspond to about 90 to 110 percent of the amount of free lime present in the magnesite, in the aggregate, and present in the chloride as calcium chloride. Some deviation from this is permissible but always with a tendency to the production of "unsound" stones as understood in the trade.

The period of mixing after addition of the magnesium chloride and sulphate solutions preferably does not exceed 5 minutes, and the entire period from addition of liquids to the dry mix, through completion of the casting operation, does not exceed 10–15 minutes. In casting the mix must be well trowelled down or the mixture should be shaken or tapped to release the trapped air.

After the stones are cast evaporation of moisture must be prevented until the mixture has set. On a large scale this is carried out by maintaining the humidity of the room at an experimentally determined value such that the wet mix neither absorbs moisture from, nor loses moisture to, the atmosphere. For flat stones it is conveniently carried out by keeping the molds covered.

After the product has been allowed to set for 24 hours at a room temperature of 65–85° F. it is removed from the mold. After the stone has set and has been removed from the mold it may be colored. The coloring is preferably done with an earthen pigment in sodium silicate. About one part of commercial silicate solution to about five parts of water, and colored as desired, may be brushed or sponged on lightly. The slabs, plates, blocks or other shapes thus formed should then be put in a dry room for about twenty-four hours at about 120° to 150° Fahrenheit to dry them as rapidly as possible. The molded forms may then be dry rubbed such as with a sander machine of the belt or disc type.

Then a finish may be applied if desired such as water proofing material, surface glaze or the like.

The resulting stone I believe has approximately the following structure. The basic skeleton is built up of relatively large particles of marble, actually 8–20 mesh, approximately in contact with each other. The interstices between these are filled in to a considerable extent with finer marble present in the commercial grading, or with finer material such as silica or marble dust substituted for part of the 8–20 marble. The voids remaining are filled with the actual magnesium oxychloride cement which serves only as a binder to hold the inorganic skeleton structure together. As indication of this we have the fact that stones so made have been cast of dimensions of 12x24x½ inch and, when treated according to this invention, show no appreciable warping in many months or when tested for warping by the usual methods.

In presenting the above explanation of the invention it is not my intention to limit myself solely to that structure if the explanation should be found to be incorrect, but solely to attempt to clarify the subject by an explanation of the effect obtained.

I claim:

1. The process of producing artificial stone comprising molding a mixture of aggregate and magnesium oxychloride cement, maintaining the mixture during the setting period under conditions which substantially prevent evaporation of moisture from the mixture, and subsequently subjecting it to drying conditions.

2. The process of producing artificial stone comprising molding a mixture of aggregate and magnesium oxychloride cement, maintaining the mixture during the setting period within a temperature range of substantially 65°–85° F. and under conditions which substantially prevent evaporation of moisture from the mixture, and subsequently subjecting it to drying at a substantially higher temperature.

3. The process of producing artificial stone comprising molding a mixture of aggregate and magnesium oxychloride cement, retaining the mixture in the mold during the setting period with a cover on the mold which prevents evaporation of moisture from the mixture, and subsequently removing the stone from the mold and subjecting the stone to drying conditions.

4. The process of producing artificial stone comprising molding a mixture of aggregate and magnesium oxychloride cement, retaining the mixture in the mold during the setting period with a cover on the mold which prevents evaporation of moisture from the mixture, and subsequently removing the stone from the mold and subjecting the stone to drying within a temperature range of substantially 120°–150° F.

5. The process of producing artificial stone comprising molding a mixture of aggregate and magnesium oxychloride cement, maintaining the mixture during the setting period in an atmosphere maintained at such humidity as substantially prevents evaporation of moisture from the mixture, and subsequently subjecting it to drying conditions.

6. The process of producing artificial stone comprising molding a mixture of aggregate and magnesium oxychloride cement, maintaining the mixture during the setting period in an atmosphere maintained at such humidity as substantially prevents evaporation of moisture from the mixture, and subsequently subjecting it to a drying atmosphere within a temperature range of substantially 120°–150° F.

7. The process of producing artificial stone comprising molding a mixture of aggregate and magnesium oxychloride cement, maintaining the mixture during the setting period with a temperature range of substantially 65°–85° F. and in an atmosphere maintained at such humidity as substantially prevents evaporation of moisture from the mixture, and subsequently subjecting it to a drying atmosphere at a substantially higher temperature.

8. The process of producing artificial stone comprising mixing aggregate, magnesium chloride, material containing active magnesium oxide, and magnesium sulphate in amount approximately corresponding to 90 to 110 percent of the amount of free lime present in the aggregate and material containing magnesium oxide to prevent the formation of calcium chloride, and molding the resultant mixture.

9. The process of producing artificial stone comprising mixing aggregate, magnesium chloride and material containing active magnesium oxide, the magnesium chloride and active magnesium oxide being proportioned to approximately correspond to the ratio $0.52MgCl_2:3MgO$, magnesium sulphate in amount approximately corresponding to 90 to 110 percent of the amount of free lime present in the aggregate and material containing active magnesium oxide to prevent the formation of calcium chloride, and molding the resultant mixture.

10. The process of producing artificial stone articles comprising aggregate and magnesium oxychloride cement which comprises: molding the material to form; storing the same during initial setting under humidity and temperature conditions in equilibrium with the vapor pressure of the molded material; and drying the molded articles at a temperature of from 120°–150° F. with maximum exposure of the surfaces of the articles to the heated atmosphere.

FOSTER DEE SNELL.